United States Patent [19]

Gancy et al.

[11] 4,238,305
[45] Dec. 9, 1980

[54] ELECTRODIALYTIC PROCESS FOR THE CONVERSION OF IMPURE SODA VALUES TO SODIUM HYDROXIDE AND CARBON DIOXIDE

[75] Inventors: Alan B. Gancy, Syracuse; Theodore J. Jenczewski, Sherrill, both of N.Y.

[73] Assignee: Allied Chemical Corporation, Morris Township, Morris County, N.J.

[21] Appl. No.: 88,781

[22] Filed: Oct. 29, 1979

[51] Int. Cl.$^3$ ............................................. B01D 13/02
[52] U.S. Cl. .................................. 204/180 P; 204/301
[58] Field of Search ............................ 204/180 P, 301

[56] References Cited

U.S. PATENT DOCUMENTS

| | | | |
|---|---|---|---|
| 3,901,781 | 8/1975 | Passino et al. | 204/180 P |
| 3,964,985 | 6/1976 | Giuffrida | 204/180 P |
| 4,049,519 | 9/1977 | Sloan | 204/180 P |

*Primary Examiner*—Arthur C. Prescott
*Attorney, Agent, or Firm*—Thomas D. Hoffman; Ernest A. Polin

[57] ABSTRACT

An electrodialytic process for the conversion of soda sources containing anionic and optionally nonionic impurities to high purity, high strength sodium hydroxide and carbon dioxide gas is disclosed.

8 Claims, 1 Drawing Figure

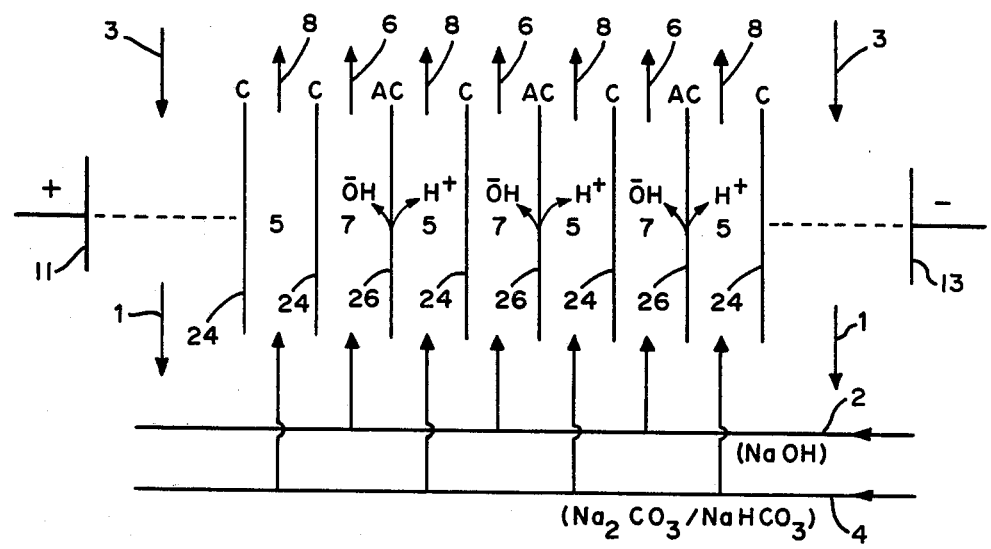

ELECTRODIALYTIC PROCESS FOR THE CONVERSION OF IMPURE SODA VALUES TO SODIUM HYDROXIDE AND CARBON DIOXIDE

DESCRIPTION

BACKGROUND OF THE INVENTION

1. Field of the Invention

This invention relates to an electrodialytic process for the conversion of aqueous solutions of sodium carbonate, sodium bicarbonate, trona or mixtures thereof into sodium hydroxide and carbon dioxide. More specifically this process concerns an electrodialytic process for the conversion of dilute soda sources having anionic and optionally nonionic impurities into high strength, high purity sodium hydroxide and high strength, high purity carbon dioxide gas.

2. Description of the Prior Art

With the discovery of trona ore in the region near Green River, Wyoming, processes useful for the recovery of soda ash products from solutions of trona have been developed. Both uncalcined trona values in dilute aqueous streams, e.g., mine waters, and, calcined trona values in aqueous process streams, e.g., pond liquors or cyrstallizer mother liquor purges have been regarded as waste materials because only limited, commercially feasible methods are known for converting these dilute streams into more valuable products. Particularly valuable products are sodium hydroxide and carbon dioxide.

Methods for the production of sodium hydroxide from sodium carbonate (soda ash) are well known in the prior art. For example, the Solvay lime-soda or ammonia-soda process yields dilute solutions of sodium hydroxide and insoluble calcium carbonate by contactng calcium hydroxide with a soda feed, e.g., sodium carbonate or sodium bicarbonate. However, soluble impurities in the sodium carbonate feed inherently carry through to the dilute sodium hydroxide product, unless they are precipitated with the calcium carbonate or salted out during the evaporative process required to produce commercial strength product. In addition, the amount of lime or calcium hydroxide required must be increased when sodium bicarbonate is used as the soda feed.

The electrolysis of aqueous sodium chloride solutions in cells divided into three compartments by permselective membranes is disclosed in U.S. Pat. Nos. 3,220,941 (Osborne) and 3,438,879 (Kircher et al.). Although these two patents describe methods for the production and separate recovery of hydrogen gas, chlorine gas, sodium hydroxide and sodium carbonate, the amount of chlorine is approximately equivalent to the total alkali produced in the form of sodium hydroxide and sodium carbonate. In addition, the sodium carbonate is generated by contacting the product sodium hydroxide with an external source of carbon dioxide.

Electrodialytic water-splitting processes have been employed in the prior art to recover valuable products from dilute soda streams. For example, U.S. Pat. No. 4,082,835 (Chlanda et al.) discloses an electrodialytic process which utilizes two or three compartment water-splitters to remove $SO_2$ from dilute gas streams by means of (a) alkaline solution scrubbing, (b) regeneration of the scrubbing solution and, (c) liberation of concentrated $SO_2$. Although one or more of these operations may be effected in a two compartment water-splitter, the compositions of the alkaline solutions fed to both compartments are identical. Further, the basic product solutions, e.g., aqueous NaOH, $NaHCO_3$, $NaHSO_4$ are dilute and impure and, as such are recycled for further alkaline scrubbing of a $SO_2$-containing solution.

SUMMARY OF THE INVENTION

It is accordingly an object of this invention to provide an electrodialytic process that utilizes relatively dilute soda feeds, e.g., sodium carbonate, sodium bicarbonate, and calcined or uncalcined trona solutons to produce high strength, high purity sodium hydroxide.

It is another object of this invention to provide an electrodialytic process which utilizes dilute soda feeds to produce high purity, high strength sodium hydroxide and no chlorine gas.

It is a further object of this invention to provide an electrodialytic process which employs dilute, impure soda feeds to produce high strength, high purity sodium hydroxide and high strength, high purity carbon dioxide.

It is a further object of this invention to provide an electrodialytic process which operates at high current efficiency and low unit cell potential to produce high strength, high purity sodium hydroxide and high strength, high purity carbon dioxide from dilute, impure soda feeds.

Other objects and advantages of the present invention will become apparent from the description which follows.

In satisfaction of the foregoing objects there is provided by this invention a process for the production of high strength, high purity NaOH and high strength, high purity $CO_2$ from soda values in an electrodialysis cell having an anode and a cathode compartment separated by base and acid zones, which comprises the steps of:

(a) introducing an aqueous soda solution having $NaHCO_3$, $Na_2CO_3$, trona or mixtures thereof to an acid zone of the electrodialysis cell located between a cation permselective face of a bipolar membrane and one face of a cation permselective membrane;

(b) introducing an aqueous NaOH solution to a base zone of the electrodialysis cell located between an anion permselective face of a bipolar membrane and the other face of the cation permselective membrane;

(c) passing direct electric current through said electrodialysis cell thereby producing $H_2CO_3$ and $CO_2$ gas from the soda solution in said acid zone and producing a NaOH-enriched stream in the base zone;

(d) withdrawing the NaOH-enriched product stream from the base zone; and (e) withdrawing $H_2CO_3$ and $CO_2$ gas and partially depleted soda solution from the acid zone.

In one specific embodiment, the aqueous soda solution fed to the acid zone of the electrodialysis cell comprises an aqueous solution of sodium bicarbonate cake from the Solvay ammonia-soda process. In another specific embodiment, raw, uncalcined trona solutions are fed to the acid zone. A specific feature of both embodiments is the high conversion of soda values to high purity, high strength sodium hydroxide and the simultaneous maintenance of a low unit cell potential. The process of the present invention benefits from anionic impurities in these feeds, which impurities sustain ion-current flow in the acid zone even as the conversion of the soda values exceeds 90 weight % of the values initially present in these feeds.

BRIEF DESCRIPTION OF THE DRAWING

The FIGURE is illustrative of a flow diagram of the process of the present invention wherein dilute soda values are converted into high strength, high purity NaOH and $CO_2$ gas, making use of electrodialytic water splitting.

DETAILED DESCRIPTION OF THE INVENTION

The present invention is concerned with an energy efficient electrodialytic process for the recovery of high strength and high purity NaOH and high strength, high purity $CO_2$ gas from dilute, impure solutions of $Na_2CO_3$, $NaHCO_3$, calcined or uncalcined trona or mixtures thereof. These products may be recovered and used separately, or combined in another reaction zone to produce high strength, high purity $Na_2CO_3$ or $NaHCO_3$.

Specifically, it was discovered that by introducing a dilute, impure solution of $Na_2CO_3$, $NaHCO_3$, calcined or uncalcined trona or mixtures thereof into an acid zone of a two compartment electrodialytic cell, which acid zone was bounded by the cation permselective face of a bipolar membrane and a face of cation permselective membrane, and by introducing a dilute NaOH solution to a base zone of an electrodialysis cell, which base zone was bounded by the anion permselective face of a bipolar membrane and the other face of cation permselective membrane, substantially impurity-free high strength NaOH was produced in the base zone and high strength, high purity $CO_2$ was produced in the acid zone. A wide variety of dilute impure soda values, e.g., sodium carbonate crystallizer mother liquor purge, pond water containing trona or Solvay $NaHCO_3$ cake contaminated by $NH_4Cl$, $NH_3$, NaCl or mixtures thereof can be introduced to the acid zone. The impurities, which were anionic, e.g., $Cl^-$, $SO_4^=$, carboxylates and nonionic organics, do not migrate with the sodium ion from the acid zone through the cation permselective membrane into the base zone wherein NaOH is produced. Thus, one of the features of the process of the present invention is that high purity, high strength NaOH was produced from a wide variety of impure dilute solutions containing soda values, including raw uncalcined trona and sodium bicarbonate produced in the Solvay ammonia-soda process. In addition, high strength, high purity NaOH solutions having a concentration of at least 11 to 20 weight percent, usually about 15 weight percent NaOH, were produced directly without need for evaporation. The process of the present invention provides an advantages over the Solvay ammonia-soda process of the prior art which required evaporative capacity to produce such commercially feasible NaOH solutions having a concentration in the range of 11–20 weight percent, usually about 15 weight percent. In accordance with the process of the present invention, the electric energy consumption for the production of 14.8 weight percent NaOH in the two compartment electrodialytic cell was 1445 kwhr/NT of NaOH; the overall current efficiency was 80% and the unit cell voltage was 1.9 volt.

The process can operate with a wide variety of dilute impure soda solutions whereas the conventional methathesis methods, e.g., the Solvay ammonia-soda process, require relatively pure, concentrated solutions of $Na_2CO_3$. In fact when dilute, impure $NaHCO_3$ solutions are available, the process of the present invention has distinct advantages over the conventional ammonia-soda process which would require double the quantity of calcined limestone for $NaHCO_3$ compared to $Na_2CO_3$.

Whereas impurities in the soda sources are to be avoided in other prior art processes, the electrodialytic process of the present invention actually benefited from the presence of some ionic impurities, preferably anionic impurities in the acid compartment of the electrodialytic cell. Specifically, by feeding to the acid compartment the dilute, impure soda streams, sufficient anionic impurities were present in the acid compartment to maintain ion-current flow therein and thereby allow recovery of at least 90 weight percent, preferably more than 90 weight percent of the soda values in the feed while maintaining a low unit cell potential, preferably below about 3.0 volts. Thus, a low power consumption was observed for the recovery of more than 90% of the soda values from the dilute impure soda feeds, e.g., solution of purge liquor or pond water; on the other hand, cell resistance and power consumption increased markedly when the percent of soda recovered from uncalcined trona or pure sodium carbonate exceeded 90 weight % of the initial value. However, anions sufficient to maintain ion current in the acid zone to allow recovery of more than 90 weight % of the uncalcined trona values can be conveniently supplied to the acid zone by recycling at least a portion of the acid zone purge or adding dilute sodium sulfate solutions to acid zone. Accordingly, the process of the present invention had distinct economic advantages over prior art methods when relatively inexpensive, dilute impure soda values were available. Surprisingly, it was discovered that the concentration of sodium carbonate in the feed must be maintained below about 12 weight percent $Na_2CO_3$ to prevent the precipitation of $NaHCO_3$ in the acid zone during electrodialysis in accordance with the process of the present invention. When the concentration of $Na_2CO_3$ in the feed was about 12 weight percent a temperature of at least about 30° C., preferably between about 30° and 40° C. was maintained in the cell to prevent the formation of solid $NaHCO_3$ in the acid compartment during the electrodialysis. The upper temperature limit of 40° C. is preferred in order to prolong the service lifetime of the bipolar membrane. Of course, concentrations of $Na_2CO_3$ above 12 weight percent can be permitted if the integrity of the bipolar membranes can be maintained at temperatures above 40° C.

The high strength, high purity NaOH and $CO_2$ were recovered as separate products; each can be used separately, in different processes, or both can be combined after recovery from the process of the present invention to form high strength, high purity $Na_2CO_3$ or $NaHCO_3$. Alternatively, the high strength, high purity NaOH produced in accordance with the present invention may be used to neutralize the $NaHCO_3$ in trona solutions or sodium sesquicarbonate solutions and thereby increase the quantity of $Na_2CO_3$ recovered as solid $Na_2CO_3.H_2O$ since the energy required to produce $Na_2CO_3$ from $Na_2CO_3.H_2O$ is significantly less than the energy required to calcine trona, the energy efficient process of the present invention wherein high strength, high purity NaOH and $CO_2$ are produced from dilute, impure soda sources, e.g., raw trona solution has obvious economic advantages.

Another feature of the process of the present invention is the configuration of the electrodialytic cell. Each unit cell required only two kinds of permselective membranes; one bipolar and the other cation-permselective. The process operated at high current efficiency usually greater than about 70%, preferably above about 80% and low unit cell potential preferably less than 3.0 volts, more preferably less than about 2.0 volts. In addition, the process of the present invention benefited from the presence of anionic impurities in the dilute waste soda value feed to the acid compartment of the electrodialytic cell. Further by maintaining the concentration of $Na_2CO_3$ in the soda feed at a concentration less than about 12 weight %, no $NaHCO_3$ precipitate was observed.

The process may be better understood by reference to the drawing. In the FIGURE, the dilute $Na_2CO_3$/$NaHCO_3$ stream 4 was fed into acid compartments 5 wherein it converted into $NaHCO_3$ and $H_2CO_3$. While $Na_2CO_3$/$NaHCO_3$ is used in this description it is understood that any dilute solution of $Na_2CO_3$, $NaHCO_3$, uncalcined trona, $NaHCO_3$ cake from the Solvay ammonia-soda process; impure soda sources, e.g., $Na_2CO_3$ crystallizer mother liquor purges or pond waters which are known to those skilled in the art may also be used. The insolubles in the incoming stream may be removed in a separate step prior to passage to line 4. Any materials present in the stream which can coat, clog or react with the streams or apparatus are of course to be avoided. Soluble silicates, common impurities in purge liquors and pond waters can be removed by any conventional methods, e.g., the one described in U.S. Pat. No. 3,991,160. A special feature of the present invention is the beneficial effect that the presence of impurities, especially anionic impurities has on the substantially complete recovery, preferably greater than about 90 weight % of the initial soda values. The anionic impurities present in the acid compartments 5 sustained ion-current therein and thereby allowed removal of $HCO_3^-$ and $CO_3^=$ ions while maintaining the average unit cell potential preferably below about 2.5 volts, more preferably below about 2.0 volts. When the impurity level in compartment 5 is insufficient to sustain ion-current flow any convenient electrolyte, $Na_2SO_4$ may be added to compartments 5.

Another feature of the process of the present invention is the use of dilute soda streams as feed to produce high strength, high purity NaOH and $CO_2$ gas. In fact, the concentration of $Na_2CO_3$ in the feed stream 4 must be less than about 12 weight % to prevent precipitation of $NaHCO_3$ in the solutions throughout the system. When trona was employed, a maximum concentration of about 5.0 weight % $NaHCO_3$ and about 6.2 weight % $Na_2CO_3$ can be tolerated with out encountering precipitation of $NaHCO_3$ crystals. This solution was then 1.92 N in total alkaline species, i.e., $Na_2CO_3$ and $NaHCO_3$.

A dilute solution of NaOH (0.5 N) was fed via stream 2 to base compartments 7 to maintain ion-current flow therein in the initial stages of the process of the present invention.

The process of the present invention utilized a two compartment unit cell which incorporated a plurality of cation permselective 24 and bipolar ion exchange membranes 26 arranged in alternating fashion between the two electrodes 11 and 13. The two compartment unit cell comprised a base compartment 7 bounded by cation permselective ion exchange membrane 24 and an anion face of a bipolar ion exchange membrane 26 and an acid compartment 5 bounded by the cation face of a bipolar ion exchange membrane 26 and a cation permselective ion exchange membrane 24.

The cation permselective ion exchange membranes found useful in the process of the present invention have strongly acidic groups bonded to an inert polymeric material. The specific membrane chosen should have high permeability for univalent cation, e.g., $Na^+$, $NH_4^+$ and prevent passage of anions and, have high mechanical strength. The bipolar membranes found suitable in the process of the present invention can be of the type described, for example, in U.S. Pat. No. 2,829,095 which has reference to water splitting generally, the single film or cast bipolar membrane disclosed in U.S. Pat. Nos. 4,024,043, 4,140,815 and 4,116,889 respectively, which are hereby incorporated by reference. Any bipolar membrane can be employed which effectively converts water into hydrogen and hydroxyl ions.

When suitable bipolar membranes are not readily available, a structure (not shown) which in combination uses monopolar membranes and an additional compartment containing a suitable electrolyte may be used in lieu of a bipolar membrane and yet functions as a bipolar membrane. The structure consists of an anion permselective membrane and cation permselective membrane and a separate compartment therebetween; together these three components form a bipolar module. The compartment contains an electrolyte solution which can not pass through, clog or coat the membranes, e.g., an aqueous solution of polystyrene sulfonic acid. This polyfunctional electrolyte cannot migrate through the pores of the membranes because of the large size of the polystyrene molecules and the relatively small size of the pores of the membranes. Polyfunctional bases, e.g., polyvinylbenzyltrimethylammonium sulfate may also be used as the electrolyte in this compartment.

The operation of the two compartment unit cell is essentially as follows: A direct current passes from the anode 11 to the cathode 13. Stream 4 which contains $Na_2CO_3$, $NaHCO_3$, trona, $NaHCO_3$ cake, ect. or any mixtures thereof is fed to compartments 5. In compartments 5, hydrogen ion, $H^+$, from the bipolar membrane 26 is introduced. Simultaneously, sodium ions $Na^+$ migrate to compartments 7 through cation permselective ion exchange membranes 24. In compartments 5, the $H+$ ion converts the $CO_3^=$ to $HCO_3^-$ which in turn is converted to to $H_2CO_3$. The presence of anionic impurities, e.g., $Cl^-$, $SO_4^=$ etc. which retain their negative charge in a solution containing $H+$ sustains ion-current flow in compartments 5 as the $HCO_3^-$ and $CO_3^=$ are substantially all removed by conversion to $H_2CO_3$. Sustaining ion-current flow in compartments 5 is particularly important for the maintenance of low unit cell potential when the conversion of $HCO_3^-$ and $CO_3^=$ is substantially, i.e., greater than 90%, complete. Any convenient source of anions, e.g., NaCl, $Na_2SO_4$ or acid zone purge from stream 8 may be added to stream 4 as required. The $OH^-$ ion from bipolar membrane 26 reacts with the $Na^+$ from compartments 5 to form NaOH. The permselectivity of membranes 24 and 26 determines the purity of the NaOH produced in compartments 7. While cationic or nonionic species, e.g., $NH_4^+$ or $NH_3$ from solutions of sodium bicarbonate cake fed to acid compartments 5 may migrate through cation permselective ionexchange membranes 24 to base compartments 7 wherein $NH_4OH$ or aqueous ammonia is formed, anions, e.g., $Cl^-$, $SO_4^=$, $HCO_3^-$ and $CO_3^=$ should be excluded. When solutions of sodium bicarbonate cake from the Solvay ammonia-soda process are fed to acid compartments 5, the NH4OH or aqueous ammonia in the NaOH product stream is removed by any conventional means, e.g., heating, air stripping, or evaporation at subatmospheric pressure. The NaOH so produced would be of comparable strength and purity as obtained when other impure, dilute soda feeds described hereinabove are employed. At high ionic strength, some anions do migrate through membranes 24 and 26 into compartments 5. The conversion of the soda solutions may be made in a single pass through the cell or by passing the solutions through a series of stacks. The operation of the cell with the pressure on the solutions greater than atmospheric may help prevent the formation of $CO_2$ gas inside the compartments 5.

The reaction in the cell are schematically represented by the following equations:

Acid compartments:

$$Na_2CO_3 + H^+ - Na^+ \rightarrow NaHCO_3$$

$$NaHCO_3 + H^+ - Na^+ \rightarrow H_2CO_3$$

$$H_2CO_3 \rightarrow H_2O + CO_2(g)$$

Base Compartments:

$$Na^+ + OH^- \rightarrow NaOH$$

The $H_2CO_3/CO_2(g)$ are removed from compartments 5 via stream 8 and the $CO_2$ gas can conveniently be recovered therefrom by scrubbing with aqueous base, e.g., aqueous NaOH or by compression and condensation to liquid $CO_2$. At least a portion of the residual acid zone purge containing anionic impurities can be recycled via stream 4 to acid zones to maintain the ion-current therein.

The NaOH produced in compartments 7 is removed via stream 6. The concentration of the NaOH is between about 11 and 20 weight %, preferably at least about 15 weight % (4. N) and contains about 0.1 N to 0.2 N $CO_3^=$. Apparently, the $CO_3^=$ back migrates through bipolar membranes 26 from the acid compartment 5 to base compartment 7. This NaOH solution can be evaporated to produce a more concentrated solution, e.g., about 50 weight % or alternatively the NaOH can be contacted with $CO_2$ gas from stream 8 to form $Na_2CO_3$. Thus in accordance with the process of the present invention high purity, high strength, $Na_2CO_3$ was produced from impure, dilute $Na_2CO_3$ solutions.

Additional modifications of the process will be apparent to those skilled in the art within the scope of the essence of the invention herein set forth involving production of high strength, high purity NaOH and $CO_2$ from dilute soda streams by two compartment water splitting.

The invention will be further illustrated by reference to the following examples, the details of which should not be construed as limiting the invention except as may be required by the appended claims.

EXAMPLE 1

The electrodialysis stack used contained three unit cells each having 4 in² (25.81 cm²) active area. The stack consisted of a platinum anode, a Selemion® CMV (Asahi Glass Co.) strongly acidic cation permselective membrane, three unit cells, each having in order a CMV cation permselective membrane and a cast-bipolar membrane with the anion permeable side facing the anode, another CMV membrane and, a platinum cathode. The cast-bipolar membrane was prepared by a procedure disclosed in U.S. Pat. No. 4,116,889 which is hereby incorporated by reference. The membranes were held in place and separated by polyfluorocarbon gaskets which contained ports for pumping the solution through the 1/16" (2.18 mm) thick solution compartments formed by the gasket and the membrane. A cell with 9 compartments was thereby formed, the compartments being anolyte, soda, three unit cells, each having in order, base, soda and, catholyte. The anolyte and catholyte were supplied with 1 M $Na_2CO_3$ from a common reservoir.

The base compartments were charged with a 0.5 N NaOH solution. The soda compartments were charged with an uncalcined trona solution 1.89 N in $HCO_3^-$ and $CO_3^=$ and containing the following impurities: 13 ppm organics, 53 ppm $Cl^-$ and 8 ppm $SiO_2$. A direct current of 2.8 amperes was passed for a total of 16,560 sec; the active area of each unit cell was 25.81 cm². The current density was 0.1075 amps/cm² (100 amps/ft²). After the passage of current, the final base solution had the following composition: 3.53 N in NaOH, 0.02 N in $Na_2CO_3$; 7 ppm organics; 39 ppm $Cl^-$, 8 ppm $SiO_2$ and 25 ppm $SO_4^=$. Analysis of the acid compartment showed no $Na_2CO_3$ remained and that the solution was 0.13 N in $NaHCO_3$. No attempt was made to measure or contain all of the $CO_2$ generated. The overall current efficiency for total base production was 84.8% (79.6% fo $OH^-$ production) and for acid production was 83.1%. The average unit cell potential was 2.2 volts. No precipitates were observed in any of the compartments. About 90% by weight of the soda values were recovered.

EXAMPLE 2

A cell similar to that used in Example 1 was employed. To every liter of purge liquor from the evaporators of a trona to soda ash production facility 9.2 g of magnesium oxide was added to remove silica. The solution was filtered and the resultant mother liquor was diluted with water to 2.5 N in total alkalinity. Analysis of this treated purge liquor indicated the following impurities: 349 ppm organics as carbon and 28 ppm $SiO_2$. The acid compartments were charged with 690 ml of this solution. The base compartments were charged 260 ml of 0.5 N NaOH. The electrolyte compartments were charged with 560 ml of 0.5 M $Na_2CO_3$. A direct current of 2.8 amperes was passed for 24,480 sec. Analysis of the base showed that the solution was 4.29 N in NaOH, 0.18N in $Na_2CO_3$ (total alkalinity=4.47 N), and contained 2 ppm organics and <10 ppm $SiO_2$. The current efficiency was 79.3% for $OH^-$ production and 81.9% for overall alkaline production. The acid compartment contained 0.12 N $NaHCO_3$. The current efficiency for acid production was 81.6%. No precipitates were observed in the system.

EXAMPLE 3

An electrodialysis unit similar to that described in Example 1 was used. The acid compartments were charged with 690 ml of a diluted pond water solution having a total alkalinity of 2.5 N and containing 85 ppm organics, 1211 ppm $Cl^-$ and 13 ppm $SiO_2$. The base compartments were charged with 260 ml of a solution 0.5 N in NaOH. After a current of 2.8 amperes was passed for 25,200 sec., the base solution was 4.20 N in NaOH and 0.20 N in $Na_2CO_3$ and contained the following impurities levels: 5 ppm organics, 128 ppm $Cl^-$, less less than 10 ppm $SiO_2$ and 142 ppm $SO_4^=$. The overall current efficiency for production of alkaline base was 77.5% (74.1% for $OH^-$). The acid solution contained no $CO_3^=$ or $HCO_3^-$; no attempt was made to collect all the $CO_2$ gas. The current efficiency for production of $H^+$ was 80.5%. The average unit cell potential was about 2.5 volts.

EXAMPLE 4

The electrodialysis stack described in Example 1 was used without modification. A solution of 690 ml of reagent grade soda ash, 2.5 N in $Na_2CO_3$ was fed to each acid compartment and 260 ml of a solution 0.5 N NaOH was fed to each base compartment. After a current of 2.8 amperes was passed through the stack for 22,680 sec, the base compartment was shown to contain a solution 4.12 N in NaOH and 0.24 N in $Na_2CO_3$. The current efficiency for production of $OH^-$ was 82.7%. The final acid solution contained 0.14 N $NaHCO_3$. The current efficiency for production of $H^+$ was 83.9%. The average unit cell potential was about 3.0 volts.

What is claimed:

1. A process for the production of high strength, high purity NaOH and $CO_2$ from soda values in an electrodialysis cell having an anode and a cathode compartment separated by base and acid zones, which comprises the steps of:
   (a) introducing an aqueous soda solution having $NaHCO_3$, $Na_2CO_3$, trona or mixtures thereof to an acid zone of the electrodialysis cell located between a cation permselective face of a bipolar membrane and one face of a cation permselective membrane;
   (b) introducing an aqueous NaOH solution to a base zone of the cell located between an anion permselective face of a bipolar membrane and the other face of said cation permselective membrane;
   (c) passing direct electric current through the electrodialysis cell thereby producing $H_2CO_3$ and $CO_2$ gas from the soda solution in the acid zone and producing a NaOH-enriched stream in the base zone;
   (d) withdrawing the NaOH-enriched product stream from the base zone; and
   (e) withdrawing $H_2CO_3$ and $CO_2$ gas and partially depleted soda solution from the acid zone.

2. A process as described in claim 1 wherein the $Na_2CO_3$ content in the soda solution introduced in step (a) is less than about 12 weight percent.

3. A process as described in claim 1 wherein in step (a) the soda values have been at least in part derived from sodium carbonate crystallizer mother liquid purge.

4. A process as described in claim 1 wherein the soda values in step (a) are at least in part derived from trona pond water.

5. A process as described in claim 1 wherein the soda values in step (a) are at least in part derived from uncalcined trona.

6. A process as described in claim 5 wherein the initial concentration of $NaHCO_3$ is less than about 5 weight percent and that of $Na_2CO_3$ is less than about 6.2 weight percent.

7. A process as described in claim 1 wherein the NaOH product stream from step (d) is contacted with $CO_2$ gas to form $Na_2CO_3$.

8. A process as described in claim 1 wherein the aqueous soda solution contains sodium bicarbonate from the Solvay ammonia-soda process.

* * * * *

UNITED STATES PATENT AND TRADEMARK OFFICE
CERTIFICATE OF CORRECTION

PATENT NO. : 4,238,305
DATED : December 9, 1980
INVENTOR(S) : Gancy et al.

It is certified that error appears in the above-identified patent and that said Letters Patent are hereby corrected as shown below:

Col. 1, line 35: "tactng" should read --tacting--.
Col. 3, line 52: "advantages" should read --advantage--.
Col. 5, line 53: "with out" should read --without--.
Col. 6, line 29: "can not" should read --cannot--;
      line 40: "ect." should read --etc.--;
      line 47: "to to" should read --to--;
      line 66: "ionexchange" should read --ion exchange--.
Col. 7, line 16: "reaction" should read --reactions--;
      line 27: "Na + + " should read --$Na^+$ + --.
Col. 8, line 29: "fo" should read --for--.
Col. 10, line 18: "liquid" should read --liquor--.

Signed and Sealed this

Twelfth Day of May 1981

[SEAL]

Attest:

RENE D. TEGTMEYER

Attesting Officer    Acting Commissioner of Patents and Trademarks